UNITED STATES PATENT OFFICE.

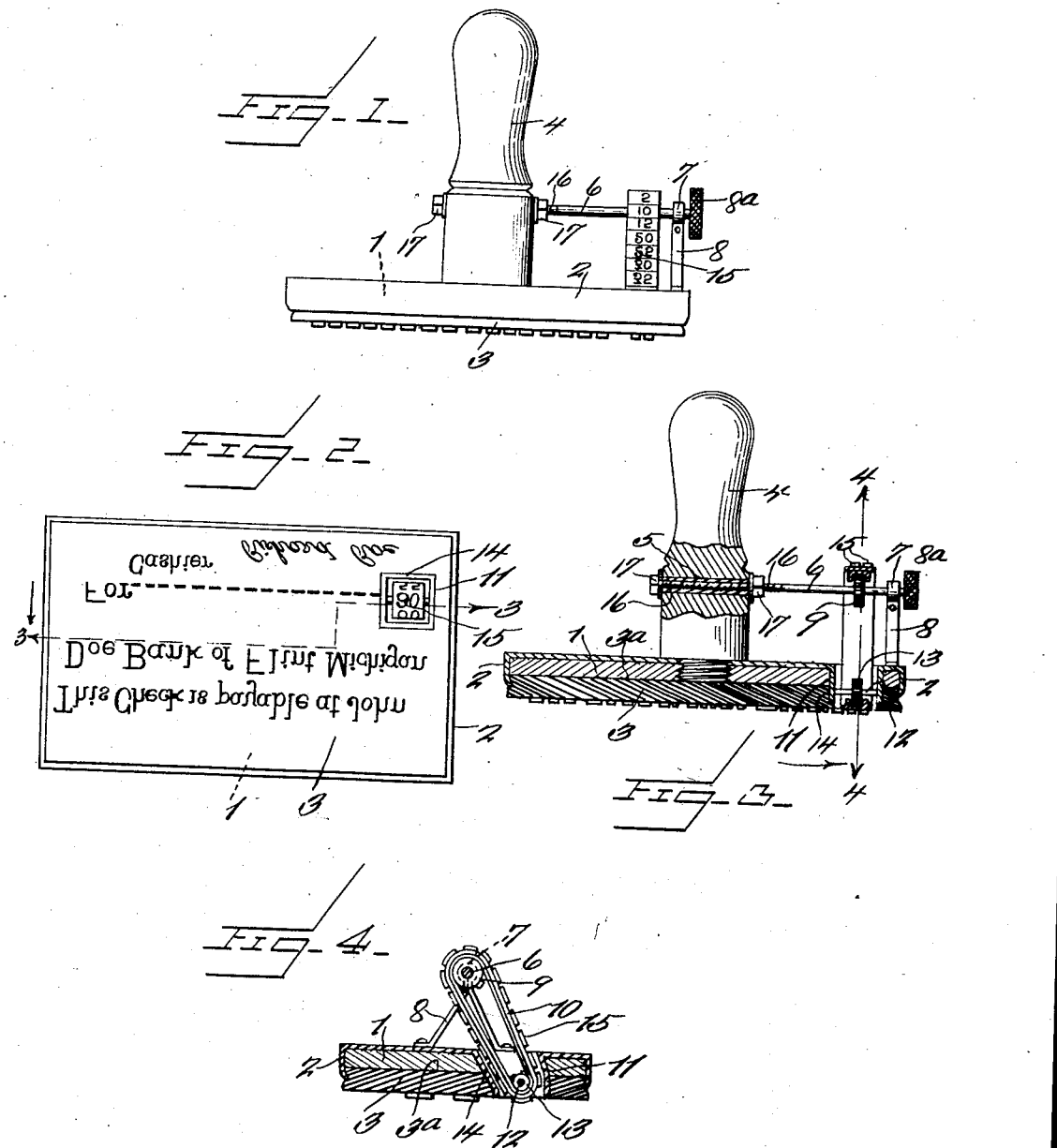

JOSEPH DERSCHA, OF FLINT, MICHIGAN.

AMOUNT-CERTIFICATION RUBBER CHECK-STAMP FOR BANKS.

1,347,259.

Specification of Letters Patent.

Patented July 20, 1920.

Application filed January 28, 1920. Serial No. 354,665.

*To all whom it may concern:*

Be it known that I, JOSEPH DERSCHA, a citizen of Jugo-Slovakia, residing at Flint, in the county of Genesee and State of Michigan, have invented certain new and useful Improvements in Amount-Certification Rubber Check-Stamps for Banks, of which the following is a specification, reference being had to the accompanying drawings.

This invention relates to an improved amount certification rubber check stamp particularly adapted for use by banks.

It is well known that persons inadvertently overdraw their accounts at banks and also that there are some persons who draw checks knowing full well that their accounts are over-drawn, or that they have no account at a bank, and therefore, an object of this invention is to overcome this practice.

For instance, it is the aim of this invention to revise and change the present day banking system particularly in the issuing and the drawing of checks. The change or revision of this particular of the banking system involves the issuing of check books to depositors having a check certified by the cashier for not over a certain amount. In other words when a person opens an account, say for example, $500, though not necessarily, the checks of the check book will be stamped by the cashier, certifying that the check is payable by the bank not over certain amounts. The stamp which may be used by the cashier also carries a facsimile of the cashier's signature. The check book containing thirty-seven checks may then be issued to the depositor and the checks thereof will be certified to in various amounts, ranging from $5 to $25 in multiples of five dollars each. For instance, there may be six checks for $25 each amounting to $150; five checks at $20 each amounting to $100; seven checks at $15 each amounting to $105; ten checks at $10 each amounting to $100; and nine checks at $5 each amounting to $45, making a total of $500. It is obvious that check books may be stamped in this manner for different amounts, in other words, the invention is not to be confined to any particular sum.

Under this system, the banking house would know full well that should a forged check be presented, unless the forger by some means secured a check of a depositor, that the check was a forgery. Furthermore, those who are paid by check with this system in vogue, would have no hesitancy in receiving the check, particularly if the person who wrote the check had been in the habit of over-drawing the account, and furthermore with this system disputes as to whether a check is good or bad may be avoided.

The invention further aims to provide an amount certification rubber check stamp, comprising a body having means for holding the rubber stamp in place, and means in connection therewith for printing or impressing the amounts, the same time that the amount certified is stamped on the check.

A further object is to provide means whereby the amounts may be changed.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view showing the stamp constructed in accordance with the invention.

Fig. 2 is a view showing the impression face of the stamp.

Fig. 3 is a vertical sectional view through the stamp, on the line 3—3 of Fig. 2, and Fig. 4 is a cross sectional view on line 4—4 of Fig. 3.

Referring more especially to the drawings, 1 designates a suitable body, preferably constructed of wood, though not necessarily, and secured to its marginal edge is a metallic flange 2. This flange 2 projects sufficiently from one face of the body, to act as means for holding the rubber impression stamp 3 to the body of the implement. The rubber impression stamp may also be secured to the body adhesively in addition to the holding flange 2, which is slightly turned over the marginal edge of the rubber stamp.

Secured to the body 1 is a handle 4 transversely of which a tubular bearing 5 is arranged. A shaft 6 is mounted in said bearing 5, and is also mounted in a bearing 7 of a bracket 8, which is secured in any suitable manner to the body 1. One end of the shaft 6 has a knob 8ª, by which the shaft may be manually rotated. Also fixed to the shaft is a sprocket or toothed wheel 9, which is engaged by an endless belt 10. The body of the stamp is provided with an opening 11, and in bearings of the opposite ends of the opening, a shaft 12 is mounted. This shaft 12 carries a toothed roller 13 about which the endless belt 10 travels. The opening 11 in the body is lined with a metallic frame 14. The outer face of the endless belt is provided with embossed numbers 15 ranging from five dollars upward in multiples of five. These amounts may go as high as one hundred, two hundred or five hundred dollars, though not necessarily, for the belt may have numbers of any amount. The rubber impression stamp which is secured to the body adhesively and by means of the flange has its impression face provided with data which reads "This check is payable at John Doe Bank of Flint, Michigan for." This reading is embossed on the impression face of the stamp and the word "for" is designed to end in close position to where the amount of the endless belt will appear through the opening in the stamp so that when the stamp is applied on the check, the face of the check will read "This check is payable by the John Doe Bank of Flint, Michigan for $60.00." The impression face of the stamp also has embossed thereon the word "Cashier" and below the name of the cashier "Richard Roe".

The shaft 6 is provided with threads 16 to be engaged by nuts 17 to not only prevent axial movement of the shaft, but also to retain the shaft against rotation, by turning the nuts tight against the ends of the tubular bearing 5 in which the shaft is mounted. By holding the shaft from rotating, it will be observed that the endless belt will be prevented from movement after it has been once set.

The invention having been set forth, what is claimed as new and useful is:—

1. In an amount certification rubber check stamp, the combination with a body provided with a rubber impression face for stamping bank checks, a handle for the body, said body having an opening, an endless belt provided on its outer face with various amounts, means for supporting the belt, whereby but a single amount may appear through the opening at one time, said means comprising a roller in said opening, a rotating shaft mounted in bearings of the handle, and of the body and provided with a sprocket to be engaged by said belt which also passes over the roller in the opening.

2. In an amount certification rubber check stamp, the combination with a body provided with a rubber impression face for stamping bank checks, a handle for the body, said body having an opening, an endless belt provided on its outer face with various amounts, means for supporting the belt, whereby but a single amount may appear through the opening at one time, said means comprising a roller in said opening, a rotating shaft mounted in bearings of the handle, and of the body and provided with a sprocket to be engaged by said belt which also passes over the roller in the opening, and means for holding the shaft in different adjusted positions.

3. In an amount certification rubber check stamp, the combination with a body having a rubber impression face provided with an amount certification, a handle carried by the body, a bearing bracket on the body, a shaft mounted in the bearing bracket and the handle, the body having an opening, a roller engaging the opening, and an endless belt operatively engaging the roller and the shaft and provided with different amounts embossed on its outer face.

4. In an amount certification rubber check stamp, a body comprising a plate having a stamp retaining marginal flange, an insert element engaged and held adjacent the plate by said marginal flange, a rubber stamp held adjacent the insert element by the marginal flange, said plate having a flanged opening, the flange of which extending through the insert element and the rubber stamp, a toothed roller mounted in bearings of the flange of said opening, a handle detachably secured to and rising from the upper face of said plate, a bearing on the plate, a shaft removable in said bearing and having one end detachably mounted in a bearing of the the handle, a second toothed roller on the shaft alined with the first roller, and an endless belt provided on its outer face with various amounts operatively connecting with said rollers.

5. In an amount certification rubber check stamp, a plate having a marginal flange and provided with a flanged opening near one end, a rubber stamp detachably connected to the plate by the marginal flange, an insert element between the rubber stamp and the plate, the rubber stamp and the insert element having registering openings through which the flange of the opening of the plate extends, a handle detachably connected to and rising upwardly from the plate, a bearing on the upper face of the plate at one end, a shaft having one end rotatably mounted in the bearing and its other end detachably mounted in a bearing of the handle, toothed rollers respectively mounted upon the shaft and in bearings of the flange of the opening, an endless belt provided on its outer face with various amounts operatively connecting the toothed rollers, and means on the shaft coöperating with the handle to tighten and hold the shaft set.

In testimony whereof I hereunto affix my signature.

JOSEPH DERSCHA.